United States Patent
Dong (10) Patent No.: US 9,330,177 B2
(45) Date of Patent: May 3, 2016

(54) SYSTEM, METHOD AND DEVICE FOR INTERNET SEARCH BASED ON PEER-TO-PEER NETWORK

(71) Applicant: Fang Dong, Beijing (CN)

(72) Inventor: Fang Dong, Beijing (CN)

(73) Assignee: DONG SOFTWARE STUDIO BEIJING, Beijing (CN)

( * ) Notice: Subject to any disclaimer, the term of this patent is extended or adjusted under 35 U.S.C. 154(b) by 85 days.

(21) Appl. No.: 13/776,552

(22) Filed: Feb. 25, 2013

(65) Prior Publication Data

US 2014/0244609 A1    Aug. 28, 2014

Related U.S. Application Data

(63) Continuation-in-part of application No. PCT/CN2011/078886, filed on Aug. 25, 2011.

(30) Foreign Application Priority Data

Aug. 27, 2010    (CN) .......................... 2010 1 0264908

(51) Int. Cl.
*G06F 17/30*    (2006.01)

(52) U.S. Cl.
CPC .... *G06F 17/30864* (2013.01); *G06F 17/30206* (2013.01)

(58) Field of Classification Search
CPC ..................... G06F 17/30867; G06F 17/30657
USPC .......................................................... 707/706
See application file for complete search history.

(56) References Cited

U.S. PATENT DOCUMENTS 8,402,375 B1 *    3/2013    Skare et al. ................... 715/738
2004/0148333 A1 *    7/2004    Manion et al. ................. 709/201

(Continued)

FOREIGN PATENT DOCUMENTS

CN    101184016 A    5/2008
CN    101375578 A    2/2009

(Continued)

OTHER PUBLICATIONS

Unger et al, "Towards a Decentralized Search Engine for P2P-Network Communities", 2003, IEEE, pp. 1-8.*
Tao gu et al., "A Peer-to-Peer Architecture for Context Lookup", 2005, IEEE, pp. 1-9.*
Sumeth Lerthirunwong et al., "Index Distribution Technique for Efficient Search on Unstructured Peer-to-Peer Networks", 2008, IEEE, pp. 1-4.*

(Continued)

*Primary Examiner* — Etienne Leroux
*Assistant Examiner* — Jared Bibbee
(74) *Attorney, Agent, or Firm* — Zareefa B. Flener; Flener IP Law, LLC (57) ABSTRACT

A system, method and device for the internet search based on the peer-to-peer network are provided. A search terminal is set up in each search peer to form a peer-to-peer network. The search request is sent from an original search peer to other search peers progressively via the broadcast/back-propagation mechanism of the peer-to-peer network. Each search peer responds the search request separately, and searches its local index library. The search results of all search peers are gathered in the original search peer, and the original search peer aggregates and sorts the search results. Such search system structure and method have made a complete breakthrough from the architecture of existing search systems, and have provided novelty architecture of the search system, which thoroughly solves the high workload of the search engine server in existing technologies.

18 Claims, 4 Drawing Sheets

(56) References Cited

U.S. PATENT DOCUMENTS

| | | | |
|---|---|---|---|
| 2006/0248062 A1* | 11/2006 | Libes et al. | 707/3 |
| 2007/0112758 A1* | 5/2007 | Livaditis | 707/5 |
| 2008/0162398 A1* | 7/2008 | Nolan et al. | 706/55 |
| 2010/0161752 A1* | 6/2010 | Collet et al. | 709/216 |
| 2011/0153586 A1* | 6/2011 | Wang et al. | 707/706 |
| 2012/0089585 A1* | 4/2012 | Rose et al. | 707/706 |
| 2013/0212226 A1* | 8/2013 | Gordon et al. | 709/219 |

FOREIGN PATENT DOCUMENTS

| | | |
|---|---|---|
| CN | 101741844 A | 6/2010 |
| CN | 201010264908.5 | 12/2010 |
| CN | 201010264908.5 | 6/2011 |
| WO | PCT/CN2011/078886 | 3/2012 |

OTHER PUBLICATIONS

Vana Kalogeraki et al., "A Local Search Mechanism for Peer-to-Peer Networks", Nov. 4, 2002, ACM, pp. 1-8.*

Arturo Crespo et al., "Routing Indices for Peer-to-Peer Systems", Jul. 2002, pp. 1-11.*

Ronaldo A. Ferreira et al., "Randomized Protocols for Duplicate Elimination in Peer-to-Peer Storage Systems", Jul. 28, 2010, pp. 1-8.*

Dimitrios Tsoumakos et al., "A Comparison of Peer-to-Peer Search Methods", Jun. 12, 2003, pp. 1-6.*

International Search Rprt, Fang Dong.

* cited by examiner

SYSTEM, METHOD AND DEVICE FOR INTERNET SEARCH BASED ON PEER-TO-PEER NETWORK

CROSS-REFERENCE TO RELATED APPLICATION

The application is a continuation in part of PCT/CN2011/078886 (filed on Aug. 25, 2011), which claims priority of Chinese patent application 201010264908.5 (filed on Aug. 27, 2010), the contents of which are incorporated herein by reference.

FIELD OF THE INVENTION

The embodiments of the present invention are related to a system, method and device for internet search, especially to a system and method for internet search based on a peer-to-peer network, which, distributes data storage and operation of the search system into user peers, and hence reduces the cost of constructing and maintaining the search engine. The present invention belongs to the internet search technology.

BACKGROUND OF THE INVENTION

The Internet search technology is one of key technologies in the Internet application. Users search huge data of the internet for their concerned content via the Internet search engine.

The existing Internet search technologies are generally implemented by establishing a set of search engine servers by search service providers. The search engine server grabs the information of each webpage on the Internet, organizes and stores index information of data available for search (such as address, title, content, anchor text, and so on) of each webpage according to certain data structures, and hence sets up a huge index library. In the query, the user generally sends a search keyword to the search engine server. Then the search engine server searches the index library it builds according to the input keyword, sorts the search results according to certain rules, and sends the results to the user who requests the query.

However, the existing Internet search technologies have following disadvantages:

First, the large distributed storage and computing system built in the data center of the search engine server cost a lot. The maintenance and operation also cost a lot, and a lot of energy and network bandwidth are needed.

Secondly, the expansion speed of the storage system capacity and the improvement speed of the computing ability of the data center cannot catch up with the growth speed of the contents in the Internet, which decreases the proportion of the indexed web pages in all web pages. This goes against the improvement of the relevance of search results.

Furthermore, it is difficult for this search technology to improve and adjust the sorting according to the relevance of search results. A tremendous amount of work is required for manual sorting.

In view of the above disadvantages of existing technologies, embodiments of the present invention provide a search system, method and device to realize the Internet search service based on the peer-to-peer network.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below; various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

The present invention is further described in detail hereinafter with reference to the accompanying drawings as well as embodiments so as to make the objective, technical scheme and merits thereof more apparent.

Embodiments of the present invention provide a system, method and device for internet search based on a peer-to-peer network to solve the problems in existing technologies, which distributes the data storage and the operation of the search system to user peers, and hence reduces the cost of constructing and maintaining the search engine.

Embodiment 1

Figure 1:
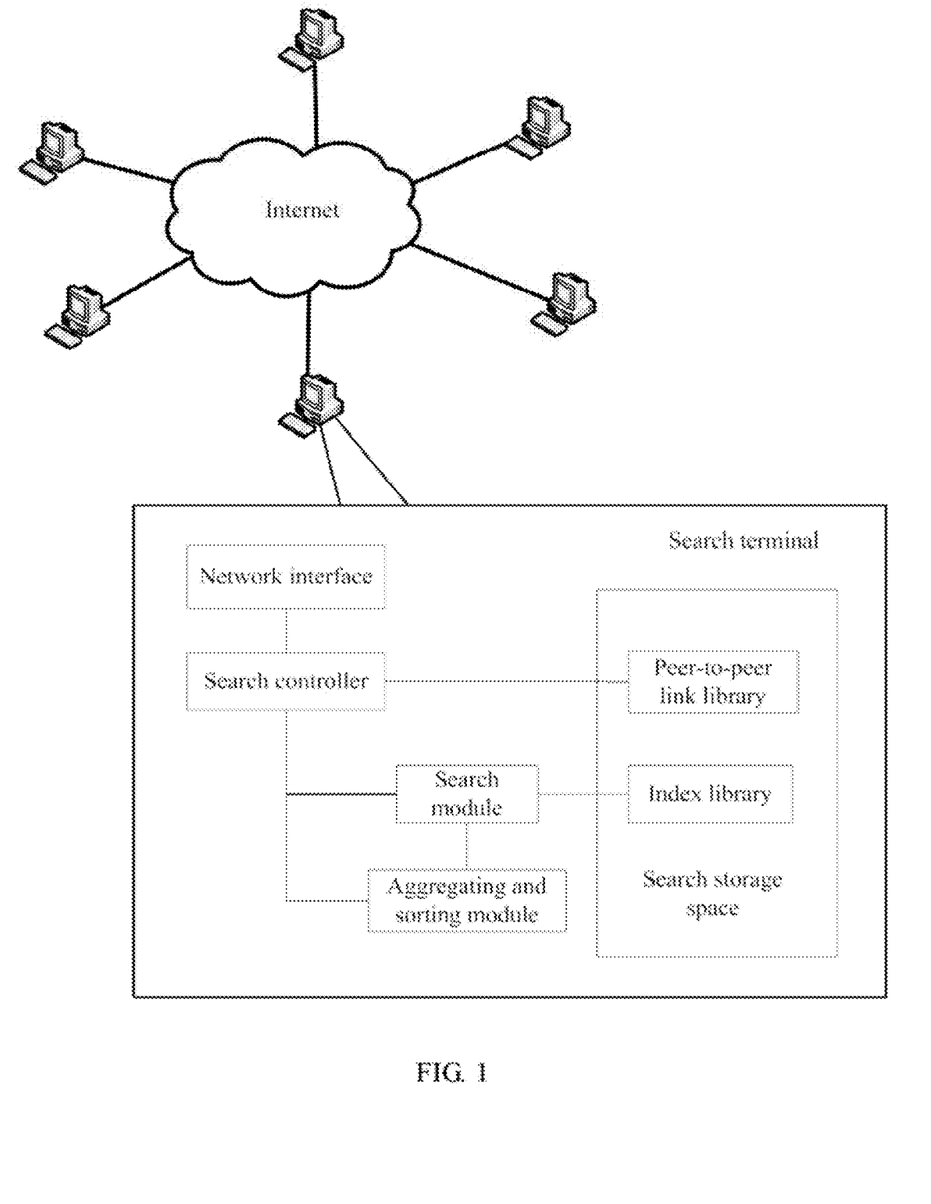
FIG. 1 illustrates the structure diagram of a system for Internet search based on the peer-to-peer network in Embodiment 1.

FIG. 1 illustrates the structure diagram of a system for Internet search based on a peer-to-peer network in Embodiment 1. Each search peer is connected with others through the Internet to form the peer-to-peer network. A search terminal is set up in each search peer.

As illustrated in FIG. 1, the search terminal at least includes a network interface, a search controller, a search storage space, a search module, and an aggregating and sorting module.

The network interface is connected with the search controller, and the search terminal is connected to the internet through the network interface.

The search controller is the core control device of the search terminal, and is adopted to control functional modules in the search terminal.

The search storage space is a storage device of the search terminal, and at least includes an index library and a peer-to-peer link library. The index library is adopted to store index information of web pages, which is for the search terminal's searching. The peer-to-peer link library is adopted to store link information between the current search peer and adjacent search peers. The peer-to-peer link library is directly connected with the search controller. The link information is invoked by the search controller to achieve communication link among peers. The index library is connected with the search controller via the search module.

The search module is controlled by the search controller and adopted to search the index library according to the keyword of user's search request and send search results to the aggregating and sorting module.

The aggregating and sorting module is connected with the search controller and the search module respectively, and adopted to aggregate and sort the search results sent by the search module, and send the search results aggregated and sorted to the search controller.

In one embodiment, the search controller is adopted to control the search module to search the index library, to invoke the link information in the peer-to-peer link library and forward the search request to subordinate search peers according to the link information, and return the search results from the search module and search results from the subordinate search peers back to a superior search peer.

In one embodiment, a skilled in the art can be understand that the aggregating and sorting module is not necessary for peer-to-peer searching itself, it is used for get a better search results.

As mentioned above, each search peer in the Internet search system based on the peer-to-peer network has a search terminal described as above. When one search peer issues a search request, the search controller of this search peer controls its local search module to search its local index library, and invokes link information stored in the peer-to-peer link library to forward the search request to other adjacent search peers at the same time. The other search peers respond, the search request, perform the local search described as above, and continues forwarding the search request to subordinate peers. After limited-level forwarding of the search request, the search results of all search peers are gathered in the original search peer who issues the search request. The final aggregated and sorted search results are propagated back to the user, so that the entire searching process is finished.

It is obviously that the system for Internet search based on the peer-to-peer network provided in the embodiment of the present invention is essentially different with existing search systems. There is no dedicated search server needed in the search system provided in the embodiment of the present invention. The search terminal is set up in each search peer to form the peer-to-peer network. The reliable research result can be finally achieved by forwarding the search request among peers with limited levels. Hence, the search system, can distribute the index information used to costing a lot of storage space in the existing data center of the search engine server to the search storage space of the search peers. Meanwhile, the access traffic and the search processing workload used to being burdened by the search server are now also distributed to search peers. This method thoroughly solves the high workload of the server in existing Internet search technologies, and also makes the processing capacity of the Internet search technology keep pace with the growth speed of contents in the Internet. Therefore, the technical effect of the search system provided by the embodiment of the present invention is obvious.

Embodiment 2

Figure 2:
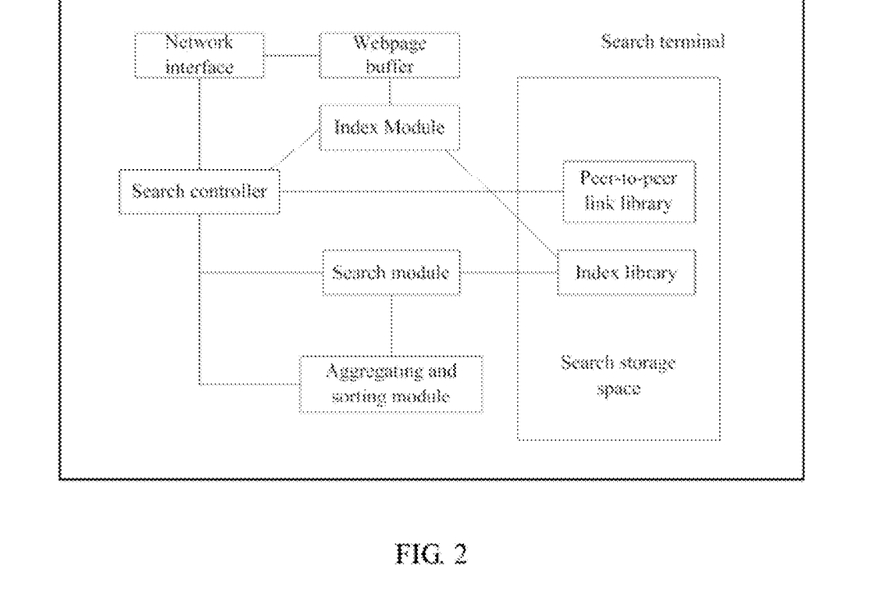
FIG. 2 illustrates the structure diagram of a system for Internet search based on the peer-to-peer network in Embodiment 2.

As shown in FIG. 2, in an embodiment of the present invention a webpage buffer and an index module is further included in the search terminal on the basis of Embodiment 1. The webpage buffer is connected with the Internet interface, and adopted to store data related to browsed web pages, such as an address, title, content, time, and website of the web pages. The index module is connected with the webpage buffer and the index library, respectively. The index module, controlled by the search controller, is adopted to obtain the data related to the web pages from the webpage buffer, extract index information of the web pages from the data, and send the index information to the index library to update the index library.

In the embodiment, by setting the webpage buffer and the index module in the search terminal, the index information in the index library of the search terminal could be updated according to web pages browsed by users. This not only makes the search result of the search system can be updated continuously according to users' usual use but also make index library update mechanism more beneficial for searching for useful information, because the search basic of the search system relies on the local index libraries of the users.

Embodiment 3

Figure 3:
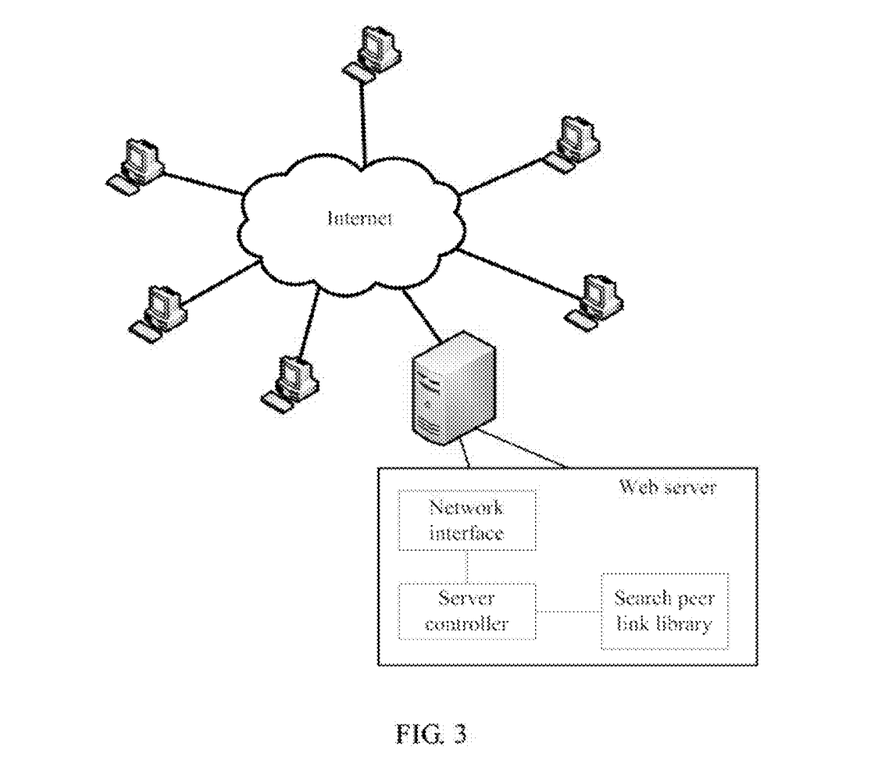
FIG. 3 illustrates the structure diagram of a system for Internet search based on the peer-to-peer network in Embodiment 3.

As shown in FIG. 3, in an embodiment of the present invention, at least one web server is further set in the peer-to-peer network on the basis of Embodiment 1. The web server includes a network interface, a server controller, and a search peer link library. The search peer link library stores the link information of search peers. The server controller is connected with the search peer link library, and also is connected with the Internet via the network interface.

The web server set up in the present embodiment is essentially different from the server in existing search systems. The web server set up in the present embodiment is only adopted to assign link information of adjacent search peers to the search terminal when the user initializes the local search terminal, to make the search terminal join the peer-to-peer network of the search system. The web server in the present embodiment need not have search function. Therefore, both the implementation cost and maintenance cost are very low.

Embodiment 4

Figure 4:
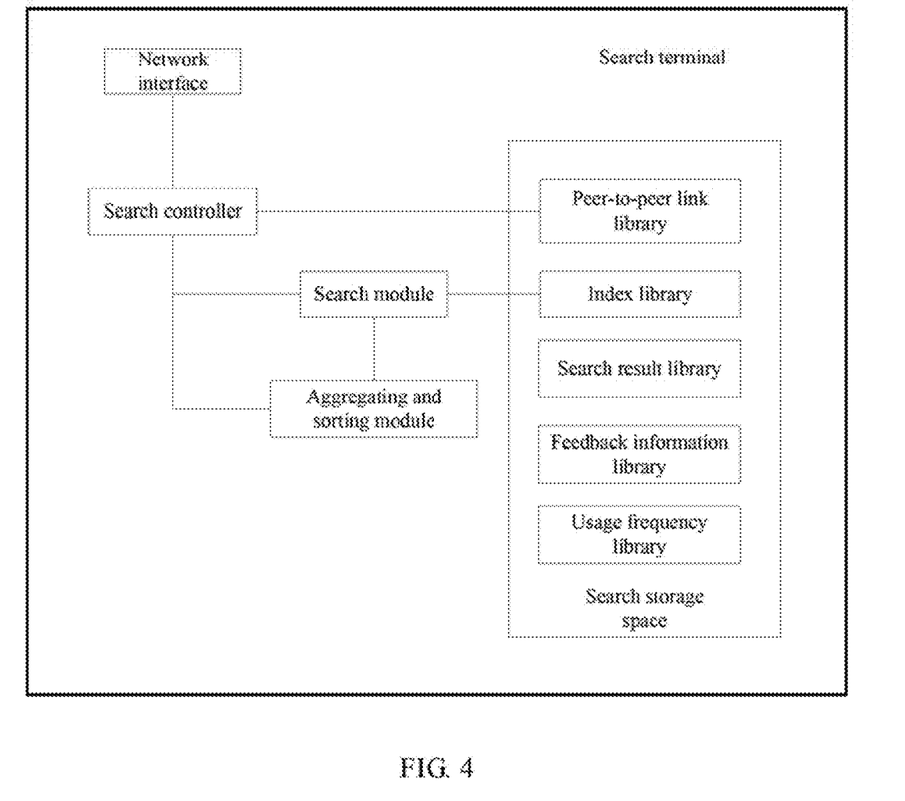
FIG. 4 illustrates the structure diagram of a system for Internet search based on the peer-to-peer network in Embodiments 4, 5, and 6.

As shown in FIG. 4, in an embodiment of the present invention, a search result library is further set up in the search storage space on the basis of Embodiment 1. The search result library is adopted to store search results of the current search peer, to provide search results more quickly when the same search is performed again, so that the search process is simplified.

Embodiment 5

As shown in FIG. 4, in an embodiment of the present invention, a feedback information library is further set up in the search storage space on the basis of Embodiment 1. The feedback information library is adopted to store users' feedback information on the search results, to provide references for aggregating and sorting of search results later when the same search is performed again.

Embodiment 6

As shown in FIG. 4, in an embodiment of the present invention, a usage frequency library is further set in the search storage space on the basis of Embodiment 1. The usage frequency library is adapted to store usage frequency information of the browsed web pages, to provide the reference for aggregating and sorting the search results.

Several feasible embodiments for the system of Internet search based on the peer-to-peer network are described as above. It is easy to see that the key point of the technical scheme is to set up the search terminal in each search peer to form a peer-to-peer network, hence the storage pressure, access pressure, and computation pressure faced by the server in existing search systems can be distributed to the search terminals of the search peers. It greatly reduces the pressure faced by the search server, and even no dedicated search server is required. Such structure of the search system has made a complete breakthrough from the architecture of existing search systems, and has provided novelty architecture of the search system, which achieves a significant technical effect.

A method of Internet search based on the above search system will be described, as follows.

Embodiment 7

Figure 5:
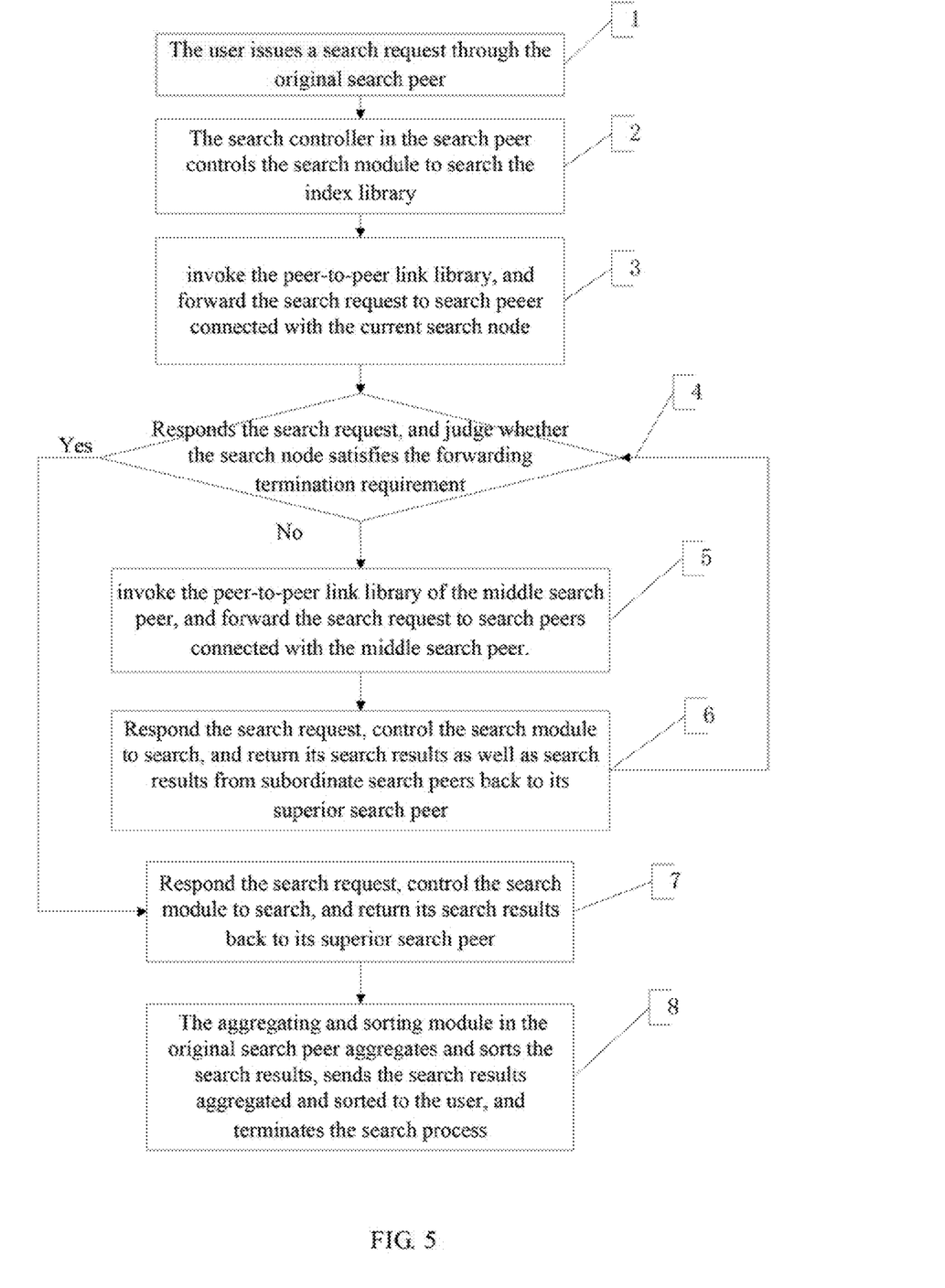
FIG. 5 illustrates the flow diagram of a method for Internet search based on the peer-to-peer network in Embodiment 7.

FIG. 5 illustrates the flow diagram of the method of Internet search based on the peer-to-peer network. The search method is based on the search system in aforementioned embodiment 1. The search method includes following steps:

(1) A user issues a search request via an original search peer.

(2) The original search peer responds the search request, and its search controller controls its search module to search the index library.

(3) The search controller in the original search peer invokes link information in its local peer-to-peer link library, and forwards the search request to search peers connected with the original search peer according to the link information.

Here, the execution order of steps (2) and (3) can be exchanged, or the two steps can be processed in parallel. No matter the steps are executed in which way, all should be considered within the protection scope of the present invention.

(4) A search peer who receives the search request, responds the search request, and judges whether itself satisfies a forwarding termination requirement. The current search peer is defined as a middle search peer if itself does not satisfy the forwarding termination requirement, and turn to step (5); otherwise, the search peer is defined as the final search peer, and turn to step (7).

The forwarding termination requirement is set to terminate the entire search process to avoid unlimitedly forwarding the search request. The forwarding termination requirement can be achieved by many methods according to the design demands. Hence, none specific implementation method will be described here.

(5) The search controller in the middle search peer invokes link information in its local peer-to-peer link library, and forwards the search request to search peers connected with the middle search peer.

(6) The middle search peer responds the search request, and its search controller controls its search module to search the index library and returns its search results as well as the search results from subordinate search peers back to its superior search peer. Then return to step (4).

(7) The final search peer responds the search request, and its search controller controls the search module to search the index, library, and returns the search results back to its superior search peer.

(8) The search controller in the original search peer controls its aggregating and sorting module to aggregate and sort the search results from other search peers as well as the results searched from its local index library; sends the search results aggregated and sorted to the user, and then the search process is finished.

It can be seen that, in the method of Internet search based on the peer-to-peer network provided in the embodiment, the user issues a search request through the original search peer and send the search request to other search peers progressively via the broadcast/back-propagation mechanism of the peer-to-peer network. Each search peer responds the search request separately, and searches its local index library. The search results of all search peers are gathered in the original search peer, and the original search peer aggregates and sorts the search results. Because peers in the peer-to-peer network form a net, it is reasonable to believe that the search request has been sent to a reliable range of search peers after limited-level forwarding. Therefore, it is reasonable to believe that the search results obtained are reliable.

Such search system structure and method, and have provided, novelty architecture of the search system, which thoroughly solves the high working pressure problem of the search engine server in existing technologies.

It is easy to found that the Internet search system and its method have made a complete breakthrough from the architecture of existing search systems by using a new peer-to-peer Internet search mechanism to accomplish the Internet search. Such search system only requires a simple peer assigning server (refer to Embodiment 3), and even no dedicated search server is required, which thoroughly solves the high workload faced by the search engine server in existing technologies.

Furthermore, the Internet search method directly uses the local index libraries in the search peers, which reflect the user practical behavior better, as the search target, hence, the search results obtained with this search method could satisfy the user's actual demand better.

Embodiment 8

Figure 6:
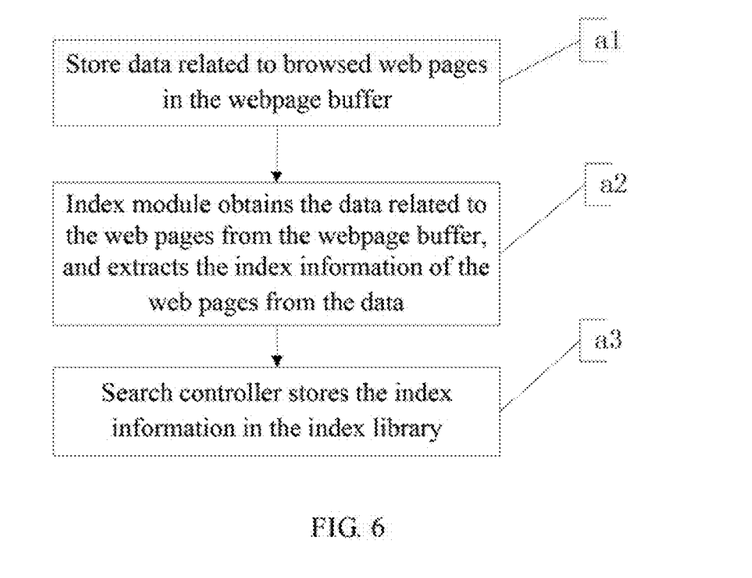
FIG. 6 illustrates the flow diagram of a method for Internet search based on the peer-to-peer network in Embodiment 8.

In an embodiment, the update mechanism of the index library in the search peer is further provided on the basis of Embodiment 7, this embodiment is based on the Internet search system of Embodiment 2. As shown in FIG. 6, the index libraries of the search peers in steps (2). (6), and (7) are updated by following steps.

(a1) Store data related to browsed web pages in the webpage buffer.

(a2) The search controller in the search peer controls the index module to obtain the data related to the web pages from the webpage buffer, and extract index information of the web pages from the data.

(a3) The search controller stores the index information in the index library.

In the above embodiment, the update mechanism of the index library for the search system is provided. By using the update mechanism, the webpage index library of the search system can be updated constantly according to users' web access, which, makes it adapt to the growth speed of the contents in the Internet nowadays. Obviously, such update mechanism of the index library is more reasonable than simply achieving the contents in the Internet through the web crawler in existing technologies.

Embodiment 9

Considering that the frequent transmission of search results between the search peers may cost a large amount of bandwidth and a lot of system resources, in an embodiment, an aggregating and sorting step is further performed by the middle search peer on the basis of the aforementioned Embodiment 7, and the information transmission frequency among the search peers is greatly reduced and the transmission process becomes more efficient. Specifically, step (6) includes following steps:

(61a) the middle search peer responds the search request, and its search controller controls the search module to search the index library and stores the search results.

(61b) after the middle search peer receives search results from the subordinate search peers, its search controller controls the aggregating and sorting module to aggregate and sort stored search resulted with the newly received search results.

(61c) the search controller checks whether the stored search results are updated with the search results aggregated and sorted. If the stored search results are updated, return the updated search result back to its superior search peer; otherwise, turn to step (61d).

(61d) the middle search peer waits for the search results from its subordinate search peers. Once the subordinate search peers return the search results back to the middle search peer, return to step (61b).

In the embodiment, the middle search peer aggregates and sorts the search results in advance, and return the search results to its superior peer only when its stored search results are updated by the search results from a subordinate search peer. So that the unnecessary data return is avoided and the data transmission efficiency is improved.

Embodiment 10

In another embodiment, another solution for the same purpose with that of Embodiment 10 is provided. In the embodiment, the Step (6) includes following steps:

(62a) the middle search peer responds the search request, and its search controller controls the search module to search the index library, and stores the search results.

(62b) the middle search peer receives search results from subordinate search peers, and judges whether all subordinate search peers have returned their search results back. If yes, turn to step (626); otherwise, turn to step (62c).

(62c) the middle search peer waits for the search results from its subordinate search peers. Once a subordinate search peer return its search results back, return to step (62b).

(62d) The search controller of the middle search peer controls the aggregating and sorting module to aggregate and sort on the stored, search results and the search results from all of the subordinate search peers, and then return the search results aggregated and sorted back to the superior search peer.

In the embodiment, within the entire search process, only after receiving the search results from all of the subordinate search peers, each middle search peer aggregates and sorts the search results and sends the search results back to the superior search peer. Therefore, the middle search peer does not need to return the search result each time receiving the search results from the subordinate search peer. Only one time return is required. The unnecessary data return is avoided and the data transmission efficiency is improved.

Embodiment 11

As is mentioned above, the forwarding termination requirement in step (4) is set to terminate the entire search process to avoid unlimitedly forwarding the search request. The forwarding termination requirement can be achieved by many methods according to the design demands. In an embodiment, a specific forwarding termination requirement is provided.

The forwarding termination requirement provided in the present embodiment is the forwarding level constraint. That is, after the original search peer issues the search request, the forwarding of the search request stops when the forwarding level of the search request among the search peers reaches a certain number. Specifically, Step (1) is modified as: The user issues the search request via the original search peer and sets the number of the forwarding level.

Step (4) is modified as: The search peer who receives the search request, responds the search request, and judges whether it: meets the forwarding level constraint. The search peer is defined as a middle search peer if it does not meet the forwarding level constraint, and turn to step (5); otherwise, the search peer is defined as the final search peer, and turn to step (7).

Embodiment 12

In an embodiment, another forwarding termination requirement is provided.

The forwarding termination requirement provided in the embodiment is the number constraint of the search result on one branch. That is, the upper bound of the sum of all search result on one branch from the original search peer to a certain search peer is set. The forwarding of the search request on a branch stops when the sum of the search results on the branch reaches the upper bound. Specifically, step (1) is modified as: The user issues the search request through the original search peer and sets the upper bound of the search result number of a branch.

Step (4) is modified as: The search peer who receives the search request, responds the search request, and judges whether the number of search on the branch from the original search peer to the current search peer reaches the upper bound. If it does not reach the upper bound, define the search peer as a middle search peer, and turn to step (5); otherwise, define the search peer as the final search peer, and turn to step (7).

Embodiment 13

In the current embodiment, a step of storing the search result finished is provided on the basis of Embodiment 7, which simplifies the search process when the same search request is issued again. The embodiment is based on the Internet search system in Embodiment 4. Specifically, before the search peer responds the search request and searches the local index library in steps (2), (6), and (7), the method further includes:

(A) The search controller in the search peer searches the search result library for the search result corresponding to the search request. If the search result corresponding to the search request is found, skip the process of searching the index library and take the search result found in the search result library as the search results of the current search peer; otherwise, execute the process of searching the index library.

After the step (8), the method further includes:

(9A) the original search peer sends the search results aggregated and sorted in step (8) to all search peers involved in the current search request. Each search peer stores the search results aggregated and sorted in the local search result library.

In another embodiment, the search peer may selectively store the search results aggregated and sorted, it is unnecessary to store all of the search results.

By using the above embodiment, the unnecessary repeated search can be avoided and the search process can be simplified.

Embodiment 14

In the current embodiment, a step for storing the feedback information about the final search results is provided on the basis of Embodiments 7, 9 and 10, and is used as a reference to adjust the aggregating and sorting process in subsequent search requests. The current embodiment is based on the Internet search system described in Embodiment 5.

In the current embodiment, when the search peer aggregates and sorts the search results in steps (8), (61b), and (62d), the method further includes:

(B) The search controller of the search peer invokes user feedback information in the feedback information library as an input parameters of the aggregating and sorting module to assist the aggregating and sorting module to aggregate and sort the search results.

After step (8), the method further includes:

(9B) the user provides feedback on the search results aggregated and sorted, and the original search peer sends the feedback information to ail search peers involved in the current search request. Each search peer stores the feedback information in the local feedback information library.

In the above embodiment, the result of the aggregating and sorting module is optimized.

Embodiment 15

In the current embodiment, the recording mechanism of usage frequency of the browsed web pages is provided on the basis of Embodiments 7, 9 and 10, and is used as a reference to adjust the aggregating and sorting process in subsequent search requests. The current embodiment is based on the Internet search system described, in Embodiment 6.

In the current embodiment, when the search peer aggregates and sorts the search results in steps (8), (61b), and (62d), the method further includes:

(C) the search controller of the search peer invokes usage frequency information of the browsed web pages in the use frequency library as an input parameter of the aggregating and sorting module to assist the aggregating and sorting module to aggregate and sort the search, results.

(9C) the search peer sends usage frequency information of the browsed web pages to all search peers involved in the current search request. Each search peer stores the usage frequency information of the browsed web pages in the local usage frequency library.

By using the above embodiment, the results of the aggregating and sorting module match the user's expectation better.

In one embodiment, a method for Internet search based on the peer-to-peer network is provided, wherein, a user issues a search request via one of search peers in a peer-to-peer network, and the method includes:

(1) responding, by a search peer, the search request, and searching locally stored index information of web pages;

(2) determining whether the search peer satisfies a forwarding termination requirement; turning to step (3) if it does not satisfy the requirement; otherwise, turning to step (5);

(3) forwarding the search request to adjacent search peers connected with the search peer: according to stored link information about: the current search peer and adjacent search peers;

(4) returning search results locally searched and returned from the subordinate adjacent search peers to its superior search peer;

(5) returning search results locally searched to its superior search peer.

In one embodiment, wherein, the search peer is the peer from which the user issues the search request; and the step (4) includes:

returning search results locally searched and search results returned from the subordinate adjacent search peers to the user: wherein, the step (5) includes:

returning search results locally searched to the user.

In one embodiment, before returning search results to its superior search peer, the method further includes:

aggregating and sorting of the search results.

In one embodiment, the method further includes:

storing data related to browsed web pages in a local webpage buffer:

extracting index information of the web pages from the data, and updating the locally stored index information of web pages according to the extracted index information.

In one embodiment, the process of returning search results locally searched and search results returned from the subordinate adjacent search peers to its superior search peer includes:

determining, when receiving search results from a subordinate adjacent search peer, the search results for the subordinate adjacent search peer is included in the set of the search results locally searched, and the search results previously returned from other subordinate adjacent search peers, returning the search results locally searched, the search results previously returned from other subordinate adjacent search peers, and the search results currently returned from the subordinate adjacent search peer to its superior search peer if the determining result is negative.

In one embodiment, the process of returning search results locally searched and search results returned from the subordinate adjacent search peers to its superior search peer includes:

waiting for the search results from all the subordinate adjacent search peers;

returning the search results locally searched and the search results returned from all of the subordinate adjacent search peers to its superior search peer.

In one embodiment, the process of determining whether the search, peer satisfies a forwarding termination requirement includes:

determining whether the search peer meets a forwarding level constraint; determining that the search peer satisfies the forwarding termination requirement if the search peer meets the forwarding level constraint; otherwise, define that the search peer does not satisfy the forwarding termination requirement;

wherein, the method further includes:

setting a forwarding level number.

In one embodiment, the process of determining whether the search peer satisfies a forwarding termination requirement includes:

determining whether the number of search results on the branch from the search peer from which the user issue the search request to the search peer meets the upper bound; determining that the search peer satisfies the forwarding termination requirement if the number meets the upper bound; otherwise, determining that the search peer does not satisfy the forwarding termination requirement;

wherein, the method further includes:

setting the upper bound of the search results number on the branch.

In one embodiment, the method further includes:

storing final search results corresponding search requests locally;

before steps (1) to (5), the method further includes:

determining whether there are search results stored locally corresponding to the search request;

returning the search results stored locally corresponding to the search request as the search results of the search peer to its superior search, peer and skipping steps (1) to (5).

In one embodiment, the method further includes:

recording user's feedback information on the search results previously aggregated and sorted;

wherein the process of aggregating and sorting of the search results includes:

aggregating and sorting of the search results according to the user's feedback information on the search results previously aggregated and sorted.

In one embodiment, the method further includes:

recording user's webpage browse frequency information on the search results previously aggregated and sorted:

wherein aggregating and sorting of the search results includes:

aggregating and sorting of the search results according to the user's webpage browse frequency information, on the search results previously aggregated and sorted.

In one embodiment, a device for Internet search based on the peer-to-peer network is provided, including a network interface, a search controller, a search storage space, a search module;

wherein, the network interface is connected with the search controller, is adopted to connect the search terminal with the Internet;

wherein, the search controller is adopted, to control the search, module;

wherein, the search storage space includes an index library and a peer-to-peer link library, wherein, the index library is connected with the search controller through the search module and is adopted to store index information of web pages; the peer-to-peer link library is directly connected with the search controller and is adopted to store link information about the current search peer and adjacent search peers;

wherein, the search module, controlled by the search controller, is adopted to search the index library according to a keyword of user's search request.

In one embodiment, the device further includes an aggregating and sorting module, connected with the search controller and the search module respectively, adopted to aggregate and sort the search results sent: from, the search module.

By using the technical schemes of the embodiments of the present: invention, the search terminal is set up in each search peer to form a peer-to-peer network. The search request is sent to other search peers progressively via the broadcast/back-propagation mechanism of the peer-to-peer network. Each search peer responds the search request separately, and searches its local index library. The search results of all search peers are gathered in the original search peer, and the original search peer aggregates and sorts the search results. Such search system structure and method have made a complete breakthrough from the architecture of existing search systems, and have provided novelty architecture of the search system, which thoroughly solves the high working pressure problem of the search engine server in existing technologies.

It should be understood that all of the embodiments disclosed in the present invention may be implemented by a computer program. The computer program may comprise program code means adapted to cause a processor in a computer or server to perform the steps of the method described when said computer program is run on a device of a user peer. For example, the program code means may be loaded in a memory, such as a RAM (Random Access Memory), from a storage medium or from another device via a computer network. Alternatively, the described features may be implemented by hardwired circuitry instead of software or in combination with software.

It should be understood that all of embodiments disclosed in the present invention can be combined or separated, which still should be considered within the scope of the present invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A tangible system for internet search based on a peer-to-peer network comprising:

a plurality of search peers, each of which is connected with the other search peers through the Internet to form a peer-to-peer network, wherein each search peer in the network has a search terminal including a network interface, a search controller, a search storage space having a unique index library and a peer-to-peer link library, a search module, a local webpage buffer and an index module;

wherein the local webpage buffer provides its search peer with internet information through a connection to the network interface which in turn is connected to the internet and is adapted to store data from webpages browsed by a user of the search terminal of the search peer;

wherein the index module of each search peer is connected to the local webpage buffer and also to the unique index library, and is adopted to, under the control of the search controller, index information acquired from its local webpage buffer and to store the information locally in the search peer's unique index library thereby creating an index library unique to the search peer and at the same time is adapted to update the unique index library of the search peer according to the data in the local webpage buffer;

wherein the search controller of a search peer is connected to the peer-to-peer link library and to the search module, and is adopted to receive a search request and to both search the unique index library in the search peer where the search request is received, and also to send the search request to the peer to peer link library where it invokes link information for the search;

wherein, the peer-to-peer link library is adapted to send the search according to the link information to other search peers in the network, additional to the search peer where the search request originated, to search their own unique index libraries;

wherein the search module of each search peer is adapted to return search results from its unique index library to the search controller, both from the search peer where the search request was initiated and from the other search peers in the network where the search request was received through the peer-to-peer link library.

2. The tangible system of claim 1, wherein, the search terminal further comprises an aggregating and sorting module, connected with the search controller and the search module respectively, adopted to aggregate and sort the search results sent from the search module.

3. The tangible system of claim 1, wherein, the search terminal further comprises a search result library, adopted to store the search results of the current search peer.

4. The tangible system of claim 1, further comprising at least one web server, adopted to assign the link information of adjacent search peers to a search terminal when a user initializes the search terminal.

5. The tangible system of claim 1, wherein the search storage space further comprises a feedback information library, adopted to store users' feedback information on the search results.

6. The tangible system of claim 1, wherein the search storage space further comprises a usage frequency library, adopted to store usage frequency information of browsed web pages.

7. A method for Internet search based on a peer-to-peer network having a plurality of search peers each having a unique index library and a peer-to-peer link library, comprising the steps of:

(1) initiating a search request by a search requestor in a first search peer;

(2) searching the unique index library of the first search peer for locally stored index information of web pages, wherein the unique index library of each search peer has information stored therein by an index module which under the control of a search controller searches for data and information from a local webpage buffer connected to the internet, and stores the information in the unique index library, and wherein the index module updates information stored in the unique index library according to the updated search controller demands and with data and information found in webpages in the local webpage buffer;

(3) determining whether the first search peer satisfies a forwarding termination requirement;

turning to step (4) if it does not satisfy the requirement; otherwise, returning search results from the first search peer;

(4) forwarding the search request to adjacent search peers connected with the first search peer via the peer-to-peer link library according to stored link information about the current search peer and adjacent search peers; and (5) returning search results from the unique link libraries searched in each adjacent search peer to the first search peer.

8. The method of claim 7, further comprising the step (6) returning search results from the first search peer and adjacent search peers to the search requestor.

9. The method of claim 8, further comprising the step before step (6) of aggregating and sorting of the search results.

10. The method of claim 9, wherein aggregating and sorting further comprises determining whether the search results from the adjacent peers is a duplicate of search results from the first search peer unique index library or the search results returned from other adjacent search peers, and if there is no duplicate result, then returning the search results of both the adjacent search peers and the first search peer to the first search peer, and then to the search requestor.

11. The method of claim 8, wherein before returning the results of both the adjacent and the first search peer to the search requestor, collecting the search results from all the adjacent search peers; and thereafter combining the collective search results with the search results from the first search peer.

12. The method of claim 3, wherein the forwarding termination requirement comprises determining whether the first search peer meets a forwarding level constraint; determining that the first search peer satisfies the forwarding termination requirement if the search peer meets the forwarding level constraint; otherwise, define that the search peer does not satisfy the forwarding termination requirement;

wherein, the method further comprises the step of:

setting a forwarding level number.

13. The method of claim 12, further comprising determining whether the number of search results from the first search peer from which the search requestor initiated the search request meets an upper bound; determining that the search peer satisfies the forwarding termination requirement if the number meets the upper bound; otherwise, determining that the search peer does not satisfy the forwarding termination requirement;

wherein, the method further comprises:

setting an upper bound of the search results number.

14. The method of claim 8, further comprising the steps of after step (6) storing final search results corresponding search requests in the first search peer;

before steps (1) to (6) determining whether there are search results stored in the first search peer corresponding to the search request, and if yes then returning the stored search results of the first peer, providing the results to the search requestor, and terminating the search.

15. The method of claim 9, further comprising:

recording requestor's feedback information on the search results previously aggregated and sorted;

wherein aggregating and sorting of the search results comprises:

aggregating and sorting of the search results according to the requestor's feedback information on the search results previously aggregated and sorted.

16. The method of claim 9, further comprising:

recording requestor's webpage browse frequency information on the search results previously aggregated and sorted;

wherein aggregating and sorting of the search results comprises:

aggregating and sorting of the search results according to the requestor's webpage browse frequency information on the search results previously aggregated and sorted.

17. A device for Internet search based on the peer-to-peer network, comprising a network interface, a search controller, a search storage space comprising a peer-to-peer link library and a unique index library, a search module, a local webpage buffer and an index module;

wherein the index module is connected to the search controller, the local webpage buffer which is connected to the internet through the internet interface and stores information regarding webpages browsed on the device, and to the index library;

wherein the index module is adapted to collect, store, and update data and information from the webpages stored in the local webpage buffer, under the control of the search controller, in the unique index library of the device;

wherein the peer-to-peer link library stores link information for all of the search peers in the network; and wherein, the search controller is also connected to the search module and directly to the peer-to-peer link library, and is adopted to control the search module to retrieve information related to the search from the unique index library of the device according to a keyword of the search request, and also to send the search request to the other search peers through link information in the peer-to-peer link library.

18. The device of claim 17, further comprising an aggregating and sorting module, connected with the search controller and the search module respectively, adapted to aggregate and sort the search results sent from the search module.

* * * * *